US012264797B2

(12) United States Patent
Wang

(10) Patent No.: US 12,264,797 B2
(45) Date of Patent: Apr. 1, 2025

(54) INFLATABLE PRODUCT WITH LIGHT-EMITTING POSITIONING STRUCTURE

(71) Applicant: ORIENTAL RECREATIONAL PRODUCTS (SHANGHAI) CO., LTD, Shanghai (CN)

(72) Inventor: Zhiyue Wang, Shanghai (CN)

(73) Assignee: ORIENTAL RECREATIONAL PRODUCTS (SHANGHAI) CO., LTD, Shanghai (CN)

( * ) Notice: Subject to any disclaimer, the term of this patent is extended or adjusted under 35 U.S.C. 154(b) by 0 days.

(21) Appl. No.: 18/399,236

(22) Filed: Dec. 28, 2023

(65) Prior Publication Data

US 2024/0328588 A1 Oct. 3, 2024

(30) Foreign Application Priority Data

Mar. 30, 2023 (CN) ........................ 202320685066.3

(51) Int. Cl.

*F21S 41/19* (2018.01)
*B63B 7/08* (2020.01)
*F21S 4/28* (2016.01)
*F21V 23/00* (2015.01)

(Continued)

(52) U.S. Cl.

CPC ............ *F21S 41/192* (2018.01); *B63B 7/085* (2013.01); *F21S 4/28* (2016.01); *F21V 23/008* (2013.01);

(Continued)

(58) Field of Classification Search

CPC ........... F21S 41/192; F21S 4/28; B63B 7/085; F21V 23/008; F21W 2107/20; F21Y 2103/37; F21Y 2115/10

See application file for complete search history.

(56) References Cited

U.S. PATENT DOCUMENTS 3,638,258 A * 2/1972 Black ........................ B63C 9/20 362/108
5,603,648 A * 2/1997 Kea ....................... B63C 9/1255 441/89

(Continued)

FOREIGN PATENT DOCUMENTS

CN 216002997 3/2022
CN 216840857 6/2022

(Continued)

OTHER PUBLICATIONS

"Notice of Registration/Notice of Grant of Utility Model Patent" CN2023062901029350 issued Jun. 29, 2023; China National Intellectual Property Administration.

*Primary Examiner* — Evan P Dzierzynski

(74) *Attorney, Agent, or Firm* — Woods Oviatt Gilman LLP; Katherine H. McGuire, Esq.

(57) ABSTRACT

The utility model discloses an inflatable product with a light-emitting positioning structure, including: a main body provided with an inflation chamber inside, and an external bin disposed on the main body, and configured to receive a luminous body; wherein the luminous body received in the external bin can be fixed relative to the external bin when the inflation chamber is in an inflated state; and the external bin and/or the main body can transmit light. The main body of the inflatable product with a light-emitting positioning structure according to the utility model is provided with a self-contained external bin, after the inflatable product is inflated, a light bar located in the external bin can be driven to be attached relative to the external bin, so that the fixing of the light bar is more convenient, and the light bar is not easy to fall off, and the safety is high; at the same time, different light bars can be selected and replaced according to the user's own needs, and the degree of freedom is high; and (Continued)

the light bar is disposed in the external bin capable of transmitting light, which has a good light transmitting effect.

23 Claims, 8 Drawing Sheets

(51) Int. Cl.
*F21W 107/20* (2018.01)
*F21Y 103/37* (2016.01)
*F21Y 115/10* (2016.01)

(52) U.S. Cl.
CPC ...... *F21W 2107/20* (2018.01); *F21Y 2103/37* (2016.08); *F21Y 2115/10* (2016.08)

(56) References Cited

U.S. PATENT DOCUMENTS

| | | | | |
|---|---|---|---|---|
| 6,742,916 | B1* | 6/2004 | Dunn | B60Q 1/32 362/540 |
| 2008/0090487 | A1* | 4/2008 | Randall | A63H 33/22 446/225 |
| 2010/0032995 | A1* | 2/2010 | Tarter | F21V 33/008 297/188.01 |
| 2010/0048071 | A1* | 2/2010 | Nascimento | B63B 32/57 441/74 |
| 2010/0248567 | A1* | 9/2010 | Carl | B63C 9/1055 441/98 |
| 2014/0268841 | A1* | 9/2014 | Stockman | B63B 45/04 362/477 |
| 2017/0067268 | A1* | 3/2017 | Tong | E04H 4/148 |
| 2018/0106470 | A1* | 4/2018 | Martinangeli | F21V 33/008 |
| 2021/0339875 | A1* | 11/2021 | Harms | B63B 22/04 |
| 2022/0276426 | A1* | 9/2022 | Willows | F21V 33/0008 |
| 2023/0097188 | A1* | 3/2023 | Mugeraya | B64D 25/14 182/18 |

FOREIGN PATENT DOCUMENTS

| | | |
|---|---|---|
| DE | 202013007221 | 12/2014 |
| WO | 2017162785 | 9/2017 |

* cited by examiner

INFLATABLE PRODUCT WITH LIGHT-EMITTING POSITIONING STRUCTURE

TECHNICAL FIELD

The utility model relates to the field of inflatable products, in particular to an inflatable product with a light-emitting positioning structure.

BACKGROUND

Currently, a method for fixing a light bar of an inflatable product often adopts double-sided adhesive application, and limiting parts such as a fastener and a clamping slot. The light bar and the inflatable product are relatively independent and not highly correlated.

By using a double-sided adhesive to directly attach the light bar to the inflatable product, it is more likely to cause the light bar to fall off after long-term use, especially for some inflatable products related to water sports; at the same time, the light bar is more prone to damage when exposed to the outside for a long period of time, and replacement after damage is less convenient; moreover, it is also dazzling in the case of dim light; in addition, during movement, since the light bar is a wrapping-type lighting fixture, certain potential safety hazards may be caused after the light bar falls off.

The method for fixing the light bar by using the limiting parts such as the fastener and the clamping slot has high tightness, and the light bar is not easy to fall off. However, the fixing using such limiting parts is generally limited by the structure of the inflatable product itself, and the degree of freedom of layout is low; and moreover, such limiting parts are generally made of hard materials, which can easily cause damages such as bumps and scratches to users on some products such as inflatable bathtubs, inflatable paddle boards, etc

SUMMARY

An object of the utility model is to solve the problems of easy falling, easy damage, high potential safety hazards, poor light transmitting, and a low freedom of layout caused by a conventional method for fixing a light bar to an inflatable product. The utility model provides an inflatable product with a light-emitting positioning structure, including an external bin specially for fixing a light bar, and has the advantages of convenient operation, good light transmitting effects, safety and a high degree of freedom.

To solve the above technical problems, an embodiment of the utility model discloses an inflatable product with a light-emitting positioning structure, including: a main body provided with an inflation chamber inside; an external bin disposed on the main body, and configured to receive a luminous body; wherein, the luminous body received in the external bin can be fixed relative to the external bin when the inflation chamber is in an inflated state; and the external bin and/or the main body can transmit light.

With the above technical solution, taking the condition that the luminous body is a light bar as an example, the main body of the inflatable product with a light-emitting positioning structure is provided with the external bin specially for installing the light bar, and the inflation chamber is inflated to expand the inflation chamber, thereby driving the light bar located in the external bin to be attached relative to the external bin. The fixing of the light bar to the inflatable product with a light-emitting positioning structure of the present application is more convenient, and the light bar is not easy to fall off, and the safety is high; exemplarily, in the present application, the external bin and the light bar can be disposed in various positions of the inflatable product, improving the degree of freedom of design and production of the product; and laying the light bar in the external bin capable of transmitting light also increases the light transmitting effect, and since the main body of the inflatable product is provided with a self-contained external bin, when the light bar is embedded/installed in the external bin, the light bar emits light, and the inflatable product also emits light as a whole, integrating with each other, and the user experience is good.

According to another specific embodiment of the utility model, the external bin is configured to allow the luminous body to insert, and the luminous body can be inserted into the external bin when the inflation chamber is in an uninflated state.

With the above technical solution, the light bar in the inflatable product with a light-emitting positioning structure of the present application is easily disassembled, and users can choose and replace different light bars according to their own needs, increasing the user's experience of the inflatable product.

According to another specific embodiment of the utility model, the main body includes an upper surface, a lower surface, and a side wall, the upper surface and the lower surface are located on opposite sides of the side wall in a thickness direction of the main body, and the upper surface, the lower surface, and the side wall enclose the inflation chamber; and any one or more of the upper surface, the lower surface, and the side wall are provided with the external bin.

According to another specific embodiment of the utility model, the main body includes an upper surface, a lower surface, and a side wall, the inflation chamber includes an upper chamber wall, a lower chamber wall, and a side chamber wall, the upper chamber wall is attached to the upper surface, the lower chamber wall is attached to the lower surface, and the side wall surrounds an exterior of the side chamber wall, and is spaced apart from the side chamber wall; and any one or more of the upper surface, the lower surface, and the side wall are provided with the external bin; and/or the side chamber wall is provided with the external bin.

With the above technical solution, the inflatable product with a light-emitting positioning structure has inner and outer layers as a whole, and has high stability.

According to another specific embodiment of the utility model, the external bin is disposed on an inner side wall and/or an outer side wall of the side chamber wall; and the external bin is located between the side chamber wall and the side wall when the external bin is disposed on the outer side wall of the side chamber wall.

With the above technical solution, the external bin and the luminous body may be disposed on the inner side wall of the side chamber wall (i.e., in the inflation chamber), and may also be disposed on the outer side wall of the side chamber wall (i.e., between the inflation chamber and the side wall), the external bin and the luminous body in the two arrangements are located inside the inflatable product, the appearance of the inflatable product is not changed, but the inflatable product can be made luminous, and the luminous body is located inside the inflatable product, so that the light transmitting effect is uniform, the permeability is better, and the aesthetics are higher; and meanwhile, the luminous body according to the technical solution will not be compressed by gas in an inflated state, so that the service life of the luminous body can be effectively prolonged.

According to another specific embodiment of the utility model, the external bin extends continuously or intermittently along the inner side wall and/or the outer side wall of the side chamber wall, the external bin includes a fifth opening and a sixth opening, and the side wall is provided with a first connecting port and a second connecting port which are configured to communicate with the fifth opening and the sixth opening, respectively.

According to another specific embodiment of the utility model, when the external bin extends continuously or intermittently along the inner side wall of the side chamber wall, the side chamber wall further includes a third connecting port and a fourth connecting port which are configured to communicate with the first connecting port and the second connecting port, respectively, the third connecting port and the fourth connecting port enabling sealing.

According to another specific embodiment of the utility model, the external bin is disposed on an outer side of the side wall, at least one external bin is provided, and the external bin extends along the side wall.

With the above technical solution, the external bin and the luminous body are arranged on the side wall, the light transmitting effect is uniform, and the whole body (e.g., the upper surface and the lower surface) of the main body appears to emit light, the permeability is better, and thus the aesthetics are higher.

According to another specific embodiment of the utility model, the side wall includes a first side surface, a second side surface, a third side surface and a fourth side surface which are connected in sequence in a circumferential direction; and the external bin extends continuously or intermittently on any one or more of the first side surface, the second side surface, the third side surface and the fourth side surface.

With the above technical solution, the external bin and the luminous body extend continuously or intermittently on any one or more of the four side surfaces of the side wall, and both a producer/designer and a user can customize the illumination of the inflatable product, with a high degree of freedom.

According to another specific embodiment of the utility model, the external bin extends continuously along the first side surface, the second side surface, the third side surface, and the fourth side surface, the external bin includes a first opening and a second opening, and the first opening is located at one end of the first side surface, and the second opening is disposed at the other end of the first side surface relative to the first opening in the circumferential direction; and when the inflation chamber is in an uninflated state, the luminous body can be inserted into the external bin through the first opening, and then extends out of the external bin through the second opening.

With the above technical solution, the external bin and the luminous body extend continuously on the first side surface, the second side surface, the third side surface, and the fourth side surface, which has a high circumferential integrity compared with other arrangements, and the arrangement along the circumferential direction is in line with human visual habits, which has good comfort.

According to another specific embodiment of the utility model, the external bin extends continuously along the second side surface, the third side surface and the fourth side surface, the external bin includes a first opening located in the second side surface, and a second opening located in the fourth side surface; and when the inflation chamber is in an uninflated state, the luminous body can be inserted into the external bin through the first opening, and then extends out of the external bin through the second opening.

According to another specific embodiment of the utility model, the external bin extends continuously along the first side surface and the second side surface, the external bin includes a first opening located in the first side surface, and a second opening located in the second side surface; and when the inflation chamber is in an uninflated state, the luminous body can be inserted into the external bin through the first opening, and then extends out of the external bin through the second opening.

According to another specific embodiment of the utility model, the external bins extend intermittently along the second side surface and the fourth side surface, respectively, the external bin located at each of the second side surface and the fourth side surface includes a first opening and a second opening; and when the inflation chamber is in an uninflated state, the luminous body can be inserted into the external bins through the first openings, and then extends out of the external bins through the second openings.

With the above technical solution, the external bin and the luminous body intermittently extend on the second side surface and the fourth side surface, respectively, and in the actual application of the product, adopting this arrangement makes disassembly and assembly easy, and improves the ease of use for users; and has a good visual effect.

According to another specific embodiment of the utility model, the external bins extend intermittently along the first side surface and the third side surface, respectively, the external bin located at each of the first side surface and the third side surface includes a first opening and a second opening; and when the inflation chamber is in an uninflated state, the luminous body can be inserted into the external bins through the first openings, and then extends out of the external bins through the second openings.

With the above technical solution, the external bin and the luminous body intermittently extend on the first side surface and the third side surface, respectively, and in the actual application of the product, adopting this arrangement makes disassembly and assembly easy, and improves the ease of use for users; and has a good visual effect.

According to another specific embodiment of the utility model, the external bins extend intermittently along the second side surface, the third side surface and the fourth side surface, the external bin located at each of the second side surface, the third side surface and the fourth side surface includes a first opening and a second opening; and when the inflation chamber is in an uninflated state, the luminous body can be inserted into the external bins through the first openings, and then extends out of the external bins through the second openings.

According to another specific embodiment of the utility model, the external bin is disposed on the upper surface and/or the lower surface, the external bin extends continuously or intermittently along a face edge or a surface of the upper surface and/or the lower surface, and at least one external bin is provided.

According to another specific embodiment of the utility model, the external bin includes a third opening and a fourth opening which are located at the same side or at different sides of the main body, and when the inflation chamber is in an uninflated state, the luminous body can be inserted into the external bin through the third opening, and then extends out of the external bin through the fourth opening.

According to another specific embodiment of the utility model, the main body includes an inner wall, an outer wall, an upper edge and a bottom surface, the inner wall encloses a receiving space in a circumferential direction, and the outer wall is disposed around the inner wall; in a height direction of the main body, the upper edge is connected to upper ends of the inner wall and the outer wall, the bottom surface is connected to lower ends of the inner wall and the outer wall, and the upper edge, a portion of the bottom surface, the inner wall, and the outer wall form the inflation chamber; and any one or more of the inner wall, the outer wall, the upper edge, and the bottom surface are provided with the external bin.

According to another specific embodiment of the utility model, the main body is provided with a power supply device; and the luminous body is a light bar, and both ends of the light bar are provided with connection terminals connected to the power supply device.

With the above technical solution, the luminous body adopts a light bar (e.g., an LED light bar), which is more environmentally friendly, and the LED light bar is higher in brightness, effectively improving the luminous effect; meanwhile, users can select different power supply devices to power the LED light bar according to their own needs, effectively improving the user experience and the playability of the inflatable product.

According to another specific embodiment of the utility model, the power supply device is a searchlight.

With the above technical solution, the lighting effect of the inflatable product can be further improved by using the searchlight as the power supply device, especially for some water sports type inflatable products, which can improve their safety in darker environment.

Figure 1:
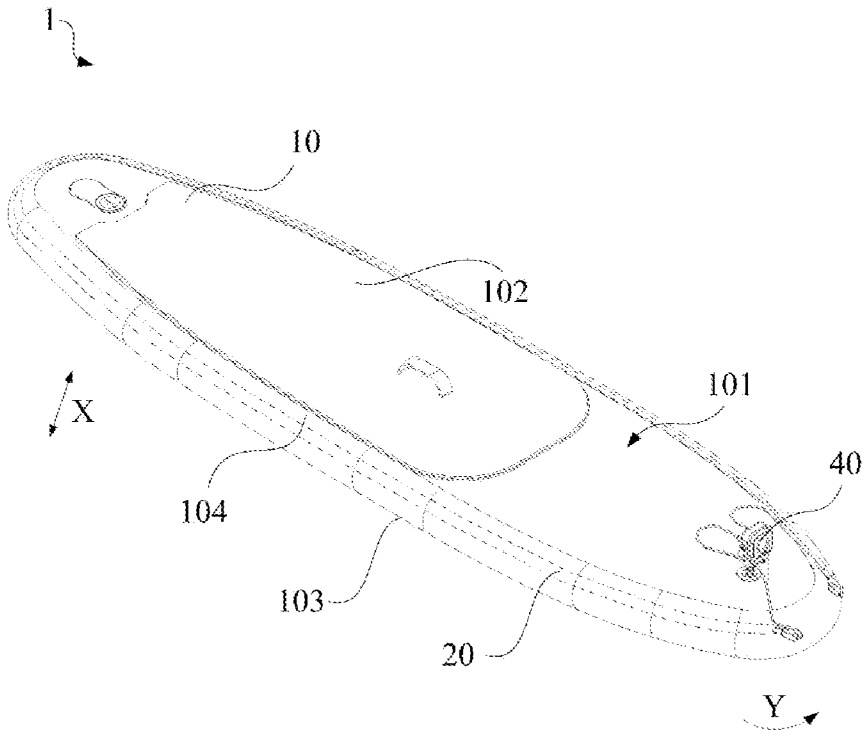
FIG. 1 shows a first schematic perspective view of an inflatable product with a light-emitting positioning structure according to the embodiments of the utility model.

In the figures: 1, inflatable product; 10, main body; 101, inflation chamber; 1011, upper chamber wall; 1012, lower chamber wall; 1013, side chamber wall; 102, upper surface; 103, lower surface; 104, side wall; 105, inner wall; 106, outer wall; 107, upper edge; 108, bottom surface; 1041, first side surface; 1042, second side surface; 1043, third side surface; 1044, fourth side surface; 20, external bin; 201, first straight segment; 202, second straight segment; 20*a*, first opening; 20*b*, second opening; 20*c*, third opening; 20*d*, fourth opening; 20*e*, fifth opening; 20*f*, sixth opening; k1, first connecting port; k2, second connecting port; k3, third connecting port; k4, fourth connecting port; 30, luminous body; 301, LED light bar; and 40, power supply device.

DETAILED DESCRIPTION

Implementation modes of the utility model are illustrated below by specific embodiments, and those skilled in the art can easily understand other advantages and effects of the utility model according to the contents disclosed in this specification. Although the description of the utility model will be introduced in conjunction with preferred embodiments, this does not represent that the features of the utility model are only limited to the embodiments. On the contrary, the description of the utility model in conjunction with the implementation modes is intended to cover other alternatives or modifications that may be derived based on the claims of the utility model. In order to provide a thorough understanding of the utility model, many specific details will be included in the following description. The utility model can also be implemented without these details. In addition, some specific details will be omitted from the description in order to avoid confusing or obscuring the key points of the utility model. It should be noted that the embodiments and the features of the embodiments of the utility model can be combined with each other without conflict.

it should be noted that in this specification, like reference numerals and letters denote like items in the following figures, and therefore, once an item is defined in one figure, it needs not be further defined and explained in the subsequent figures.

In the description of this embodiment, it should be noted that the terms “upper”, “lower”, “inner”, “bottom” and the like indicate an orientation or positional relationship based on the orientation or positional relationship shown in the drawings, or the orientation or positional relationship in which the product of the utility model is conventionally placed in use, and are merely for ease of description of the utility model and simplicity of the description, rather than indicating or implying that the device or element referred to must have a particular orientation, and be constructed and operated in a particular orientation, and therefore cannot be construed as limiting the utility model.

The terms “first,” “second,” and the like are used only to distinguish descriptions and are not to be construed as indicating or implying relative importance.

In the description of this embodiment, it should also to be noted that the terms “arranged”, “connected” and “connection” should be broadly understood unless expressly specified and defined otherwise, for example, it can be fixed connection, detachable connection or integrated connection; it can be mechanical connection or electric connection; and it can be direct connection or indirect connection through an intermediate medium, and may be internal communication of two elements. Those of ordinary skill in the art may understand the specific meanings of the above terms in this embodiment according to specific situations.

In order to make the objects, technical solutions and advantages of the utility model more clear, the embodiments of the utility model will be further described in detail with reference to the accompanying drawings.

An embodiment of the present application provides an inflatable product with a light-emitting positioning structure, the inflatable product with a light-emitting positioning structure in the embodiment of the present application may be an integrally closed inflatable object (such as an inflatable airbag, an inflatable paddle board, etc.) and may also be an inflatable object (such as an inflatable water pool, an inflatable swimming pool, an inflatable bathtub, an inflatable boat, etc.) having an opening, as long as the inflatable products can be equipped with an external bin for connecting a luminous body, they fall within the protection scope of the embodiments of the present application.

For ease of understanding, the embodiments of the present application are specifically described by taking the condition that the inflatable product is an inflatable paddle board as an example.

Figure 2:
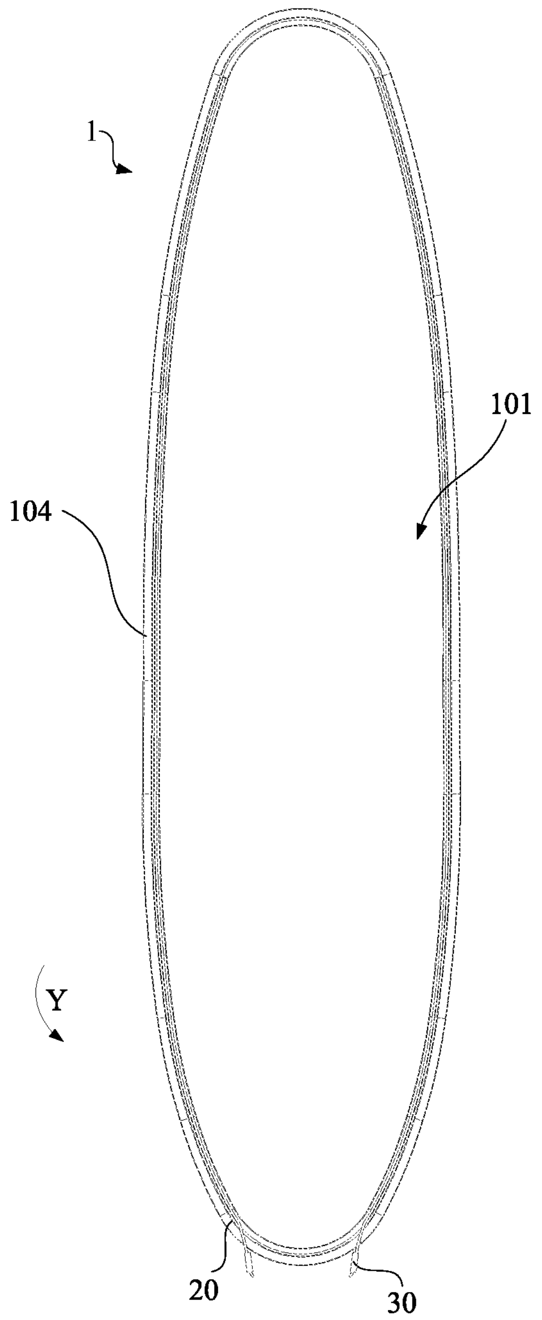
FIG. 2 shows a cross-sectional view of the inflatable product with a light-emitting positioning structure according to the embodiments of the utility model.

Please refer to FIGS. 1 and 2, FIG. 1 shows a perspective view of an inflatable product with a light-emitting positioning structure, and FIG. 2 shows a cross-sectional view of the inflatable product with a light-emitting positioning structure. As shown in FIGS. 1 and 2, the inflatable product 1 with a light-emitting positioning structure according to the embodiment of the present application includes a main body 10 and an external bin 20.

The main body 10 is provided with an inflation chamber 101 inside, and the position and shape of the inflation chamber 101 depend on a specific structure of the inflatable product 1. For example, if the inflatable product 1 is an inflatable paddle board, then the inflation chamber 101 is located inside a board body of the inflatable paddle board; and if the inflatable product 1 is an inflatable water pool, the inflation chamber 101 is a one-piece inflation chamber body formed by a side wall, an upper edge, and a bottom surface of the inflatable water pool, or a plurality of inflation chamber bodies formed by a side wall, an upper edge, and a bottom surface.

The external bin 20 is a self-contained storage component with respect to the main body 10. The external bin 20 (as shown by a dashed line in FIG. 1) is disposed on the main body 10, and configured to receive a luminous body 30. Exemplarily, the external bin 20 and/or the main body 10 are made of a material capable of transmitting light. That is, the external bin 20 is made of a material capable of transmitting light; or, the main body 10 is made of a material capable of transmitting light; or, both the external bin 20 and the main body 10 are made of a material capable of transmitting light.

The light-emitting positioning structure in the embodiments of the present application is the external bin 20, the luminous body 30 is not directly mounted on the inflatable product, but is fixed to the inflatable product through the external bin 20 having a positioning function, so that the luminescence and illumination of the inflatable product are realized.

Exemplarily, before the inflation chamber 101 is inflated, the luminous body 30 is not placed in the external bin 20, at this time, the inflatable product 1 is in an initial state of collapse as a whole, and the luminous body 30 can be inserted directly into the external bin 20; and then, the inflation chamber 101 is inflated, and the inflation chamber 101 will expand toward the external bin 20, at this time, the external bin 20 will be unfolded accordingly, and the luminous body 30 inserted into the external bin 20 can be fixed relative to the external bin 20.

In one possible embodiment, the luminous body 30 can also be originally arranged in the external bin 20, the luminous body 30 is already connected to the external bin 20 during the production of the inflatable product 1, and at this time, the luminous body 30 is fixed relative to the external bin 20 simply by inflating the inflation chamber 101, without the need to insert the luminous body 30 into the external bin 20 prior to inflation. Therefore, a positional relationship between the luminous body 30 and the external bin 20 prior to inflation is not limited in the embodiments of the present application, and as long as the luminous body 30 located in the external bin 20 can be fixed relative to the external bin 20 in an inflated state, it falls within the protection scope of the embodiments of the present application. For ease of understanding, the embodiments of the present application are described below by taking the condition that the luminous body 30 is relatively independent (i.e., not placed in the external bin 20) prior to inflation as an example.

In the embodiments of the present application, the main body 10 of the inflatable product 1 may be provided freely with the external bin 20 integrated with the main body 10 and exemplarily, the luminous body 30 may be inserted into the external bin 20 for first fixing when the inflatable product 1 is not inflated. The inflation chamber 101 is then inflated to expand the inflation chamber 101, thereby driving the luminous body 30 located in the external bin 20 to be attached for the second time relative to the external bin 20.

The fixing of the luminous body 30 to the inflatable product 1 of the present application is more convenient, and the luminous body 30 is not easy to fall off, and the safety is high; the luminous body 30 in the inflatable product 1 of the present application is easily disassembled, and users can choose and replace different luminous bodies 30 according to their own needs; exemplarily, in the present application, the external bin 20 and the luminous body 30 can be disposed in various positions of the inflatable product 1, improving the degree of freedom of design and production of the product; laying the luminous body 30 in the external bin 20 capable of transmitting light also increases the light transmitting effect, and since the main body 10 of the inflatable product 1 is provided with a self-contained external bin 20, when the luminous body 30 is inserted/installed in the external bin, the luminous body 30 emits light, and the inflatable product also emits light as a whole, integrating with each other, and the user experience is good.

Exemplarily, the main body 10 is provided with a power supply device 40 for supplying power to the luminous body 30; and the luminous body 30 is a light bar, and exemplarily, the luminous body 30 may be an LED light bar 301, and both ends of the LED light bar 301 are provided with connection terminals connected to the power supply device 40.

Exemplarily, the power supply device 40 uses a searchlight to supply power to the luminous body 30, and two connection terminals of the luminous body 30 are connected to the searchlight to realize illumination. In one possible embodiment, a combination of double-ended threads and reinforcing nuts can be used to fix the searchlight to the main body 10, so as to achieve the reliability of double-ended fixation.

In one possible embodiment, if a plurality of luminous bodies 30 are provided, parallel power supply can be used, or a plurality of power supply devices 40 can be provided, and a serial adapter can be used for conversion if serial power supply is required.

In one possible embodiment, the power supply device may also employ a storage battery, and the connection terminals are connected to positive and negative electrodes of the storage battery, thereby supplying power to the luminous body 30. Users may select a corresponding type of power supply device 40 according to their own needs.

The types, connection position and specific connection mode of the power supply device 40 and the luminous body 30 are not limited in the embodiments of the present application, and can be selected according to practical applications.

With continued reference to FIGS. 1 and 2, the main body 10 includes an upper surface 102, a lower surface 103, and a side wall 104, the upper surface 102 and the lower surface 103 are oppositely disposed in a thickness direction of the main body 10 (an X direction as shown in FIG. 1), and upper and lower ends of the side wall 104 are connected to the upper surface 102 and the lower surface 103, respectively. Exemplarily, in the thickness direction of the main body 10, a distance between the upper and lower ends of the side wall 104 is greater than or equal to a distance between the upper surface 102 and the lower surface 103.

There are two embodiments for the arrangement of the inflation chamber 101 in the embodiments of the present application.

In a first embodiment of the inflation chamber 101 in the embodiments of the present application, the upper surface 102, the lower surface 103, and the side wall 104 enclose the closed inflation chamber 101. That is, the inflatable product 1 has a single-layer structure.

Exemplarily, in a circumferential direction of the main body 10 (a Y direction as shown in FIG. 1 or FIG. 2), one end of the side wall 104 is connected between the upper surface 102 and the lower surface 103 in the thickness direction of the main body 10, and the other end is connected to one end of the side wall 104 after circumferentially surrounding for a circle.

Figure 3:
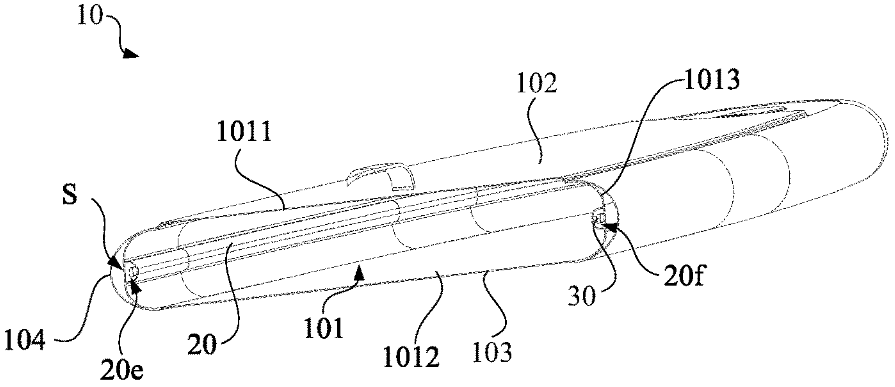
FIG. 3 shows a semi-sectional view of an arrangement of an inflation chamber and an external bin of the inflatable product with a light-emitting positioning structure according to the embodiments of the utility model; wherein the inflation chamber is spaced apart from a main body, and the external bin is disposed on an inner side wall of a side chamber wall.

In another embodiment of the inflation chamber 101 in the embodiments of the present application, as shown in FIG. 3, the main body 10 includes an upper surface 102, a lower surface 103, and a side wall 104, and the inflation chamber 101 is a separate chamber disposed within the upper surface 102, the lower surface 103, and the side wall 104. That is, the inflatable product has a two-layer structure.

The inflation chamber 101 includes an upper chamber wall 1011, a lower chamber wall 1012, and a side chamber wall 1013, the upper chamber wall 1011 and the lower chamber wall 1012 are located on opposite sides of the side chamber wall 1013 along the thickness direction of the main body 10 (the X direction as shown in FIG. 1), and the upper chamber wall 1011, the lower chamber wall 1012 and the side chamber wall 1013 enclose a complete inflation chamber 101.

The upper chamber wall 1011 is attached to the upper surface 102, the lower chamber wall 1012 is attached to the lower surface 103, and the side wall 104 is spaced apart from the side chamber wall 1013 along a width direction and a length direction of the main body 10, and the side wall 104 surrounds an exterior of the side chamber wall 1013 to form a connecting channel S.

In the above second embodiment of the inflation chamber 101, the external bin 20 may be disposed on an inner side wall and/or an outer side wall of the side chamber wall 1013. Disposing the external bin 20 on the inner side wall of the side chamber wall 1013 means that the external bin 20 is disposed inside the inflation chamber 101, and the external bin 20 and the inflation chamber 101 are relatively independent. When the external bin 20 is disposed on the outer side wall of the side chamber wall 1013, the external bin 20 is positioned between the side chamber wall 1013 and the side wall 104 (i.e., in the above connecting channel S).

In this embodiment, the inner side wall and/or the outer side wall of the side chamber wall 1013 are provided with the external bin 20, or any one or more of the upper surface 102, the lower surface 103 and the side wall 104 may be provided with the external bin 20, or both the inner side wall and/or the outer side wall of the side chamber wall 1013, and any one or more of the upper surface 102, the lower surface 103 and the side wall 104 are provided with the external bin 20.

In this embodiment, the arrangement of the external bin 20 includes, but is not limited to: the external bin 20 is disposed on the inner side wall of the side chamber wall 1013 (inside the inflation chamber 101); the external bin 20 is disposed on the outer side wall of the side chamber wall 1013 (at this time, the external bin 20 is located between the inflation chamber 101 and the side wall 104); the external bin 20 is disposed on the upper surface 102; the external bin 20 is disposed on the lower surface 103; the external bin 20 is disposed on the side wall 104; the external bin 20 is disposed on the upper surface 102 and the lower surface 103; the external bin 20 is disposed on the lower surface 103 and the side wall 104; the external bin 20 is disposed on the upper surface 102 and the side wall 104; the external bin 20 is disposed on the inner side wall of the side chamber wall 1013 and the upper surface 102; the external bin 20 is disposed on the inner side wall of the side chamber wall 1013 and the lower surface 103; the external bin 20 is disposed on the inner side wall of the side chamber wall 1013 and the side wall 104; the external bin 20 is disposed on the outer side wall of the side chamber wall 1013 and the upper surface 102; the external bin 20 is disposed on the outer side wall of the side chamber wall 1013 and the lower surface 103; the external bin 20 is disposed on the outer side wall of the side chamber wall 1013 and the side wall 104; the external bin 20 is disposed on the outer side wall of the side chamber wall 1013, the upper surface 102 and the lower surface 103; the external bin 20 is disposed on the inner side wall of the side chamber wall 1013, the upper surface 102, and the side wall 104; and the external bin 20 is disposed on the outer side wall of the side chamber wall 1013, the upper surface 102, the lower surface 103 and the side wall 104.

Thus, in both embodiments of the inflation chamber 101, the external bin 20 may be disposed on any one or more of the upper surface 102, the lower surface 103, and the side wall 104.

Hereinafter, in the embodiments of the present application, the first embodiment in which the inflation chamber 101 is provided (i.e., the inflatable product has the single-layer structure) is taken as an example to specifically describe that any one or more of the upper surface 102, the lower surface 103 and the side wall 104 are provided with the external bin 20.

There are a plurality of arrangements for the external bin 20, and the external bin 20 may be disposed on the upper surface 102, the lower surface 103, and any one or more outer side surfaces of the side wall 104, including, but not limited to, the following arrangements: first, the external bin 20 is only disposed on an outer side surface of the side wall 104; second, the external bin 20 is only disposed on an outer surface of the upper surface 102; third, the external bin 20 is only disposed on an outer surface of the lower surface 103; fourth, the external bin 20 is disposed on both the outer surface of the upper surface 102 and the outer surface of the lower surface 103; fifth, the external bin 20 is disposed on both the outer surface of the upper surface 102 and the outer side surface of the side wall 104; sixth, the external bin 20 is disposed on both the outer surface of the lower surface 103 and the outer side surface of the side wall 104; and seventh, the external bin 20 is disposed on the outer surface of the upper surface 102, the outer surface of the lower surface 103 and the outer side surface of the side wall 104.

That is, the external bin 20 may be disposed in a variety of ways as described above, and one or more external bins 20 may be provided in a variety of positions as described above. The position, shape, and number of the external bin 20 are not limited in the embodiments of the present application, and as long as the external bin 20 can receive the luminous body 30 in an uninflated state, and then the luminous body 30 is relatively fixed by inflation, it falls within the protection scope of the embodiments of the present application.

It should be noted that when the external bin 20 is disposed on the upper surface 102, the lower surface 103, and any one or more outer side surfaces of the side wall 104, the external bin 20 will be unfolded accordingly after the inflation chamber 101 is inflated to be expanded, at this time, the luminous body 30 in the external bin 20 is attached to an inner wall of the external bin 20 (e.g., one side, close to the outer side surface of the side wall 104, of the external bin 20); the fixing of the luminous body 30 can be achieved as long as the external bin 20 and the luminous body 30 are fixed to the outside, and therefore, the fixing of the luminous body 30 will not be described in detail later, and the arrangements of the external bin 20 and the luminous body 30 will be described in detail.

The embodiments of the present application are described by taking the condition that the external bin 20 is disposed on the outer side surface of the side wall 104 as an example.

As described above, with reference to FIGS. 1 and 2, one or more external bins 20 may be disposed on the outer side surface of the side wall 104. According to the above description of the connection relationship of the side wall 104, in the circumferential direction of the main body 10 (the Y direction as shown in FIG. 1 or FIG. 2), one end of the side wall 104 is connected between the upper surface 102 and the lower surface 103 in the thickness direction of the main body 10, and the other end is connected to one end of the side wall 104 after circumferentially surrounding for a circle. Thus, exemplarily, as shown in FIGS. 1 and 2, the external bin 20 may extend on the outer side surface of the side wall 104 along the circumferential direction.

Figure 4:
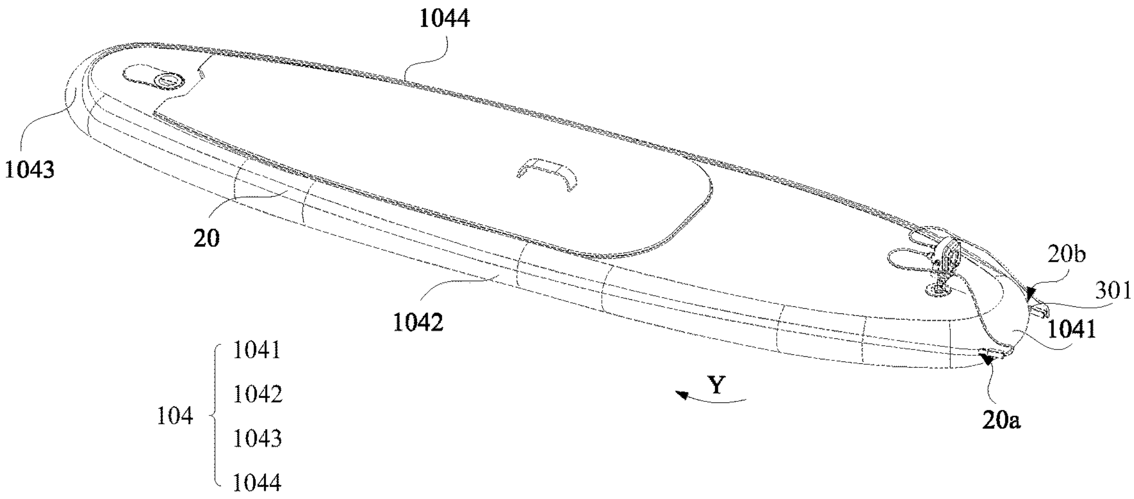
FIG. 4 shows a first schematic perspective view of an arrangement of the external bin of the inflatable product with a light-emitting positioning structure according to the embodiments of the utility model; wherein the external bin extends continuously along a first side surface, a second side surface, a third side surface and a fourth side surface.

Specifically, referring to FIG. 4, the side wall 104 includes a first side surface 1041, a second side surface 1042, a third side surface 1043, and a fourth side surface 1044 which are connected in sequence in the circumferential direction (a Y direction as shown in FIG. 4).

In one embodiment, the external bin 20 may extend continuously on any one or more of the first side surface 1041, the second side surface 1042, the third side surface 1043, and the fourth side surface 1044.

In one possible embodiment, the external bin 20 may be disposed along outer side surfaces of the four side surfaces, and continuously extends from any one side surface for one circle, two circles or more, and the specific number of circles depends on a spacing between both ends of the side wall 104 in the thickness direction of the main body (the X direction as shown in FIG. 1), the size of the external bin 20, and the specific application effect, which is not limited in the embodiments of the present application, and as long as the external bin 20 which extends continuously can be disposed on four side surfaces of the side wall 104, and the requirement that the external bin 20 receives the LED light bar 301 in an uninflated state, and the LED light bar 301 is relatively fixed by inflation is satisfied, it falls within the protection scope of the embodiments of the present application.

In one possible embodiment, the external bin 20 may be disposed along the outer side surfaces of the four side surfaces, continuously extends from any one side surface (e.g., the first side surface 1041) to the last side surface (e.g., the fourth side surface 1044), but does not fully extend on the last side surface (less than one circle).

As shown in FIG. 4, exemplarily, the external bin 20 extends continuously along the first side surface 1041, the second side surface 1042, the third side surface 1043, and the fourth side surface 1044. For example, one end of the external bin 20 is provided with a first opening 20*a*, and the other end of the external bin 20 is provided with a second opening 20*b*; the first opening 20*a* is disposed in the first side surface 1041, since the first side surface 1041, the second side surface 1042, the third side surface 1043 and the fourth side surface 1044 are connected in sequence in the circumferential direction, the external bin 20 passes through the second side surface 1042, the third side surface 1043, the fourth side surface 1044 in sequence from the first side surface 1041, and then continues to surround to the first side surface 1041, and at this time, the second opening 20*b* is disposed at the other end of the first side surface 1041 relative to the first opening 20*a* in the circumferential direction.

In this arrangement, the external bin 20 extends continuously around the side wall 104 for approximately one circle, wherein the approximately one circle means that in the circumferential direction, one section of the first side surface 1041 where the external bin 20 is not provided is a distance between the first opening 20*a* and the second opening 20*b*; when the inflation chamber 101 is in an uninflated state, one end of the LED light bar 301 is inserted into the external bin 20 through the first opening 20*a*, and the LED light bar 301 surrounds for approximately one circle inside the external bin 20, and then extends out of the external bin 20 through the second opening 20*b* which is still located in the first side surface 1041. At this time, both ends of the LED light bar 301 are spaced apart on the first side surface 1041. In one possible embodiment, the external bin 20 can extend continuously only on the outer side surface of the first side surface 1041 or the second side surface 1042 or the third side surface 1043 or the fourth side surface 1044.

In one possible embodiment, the external bin 20 may extend continuously on the outer side surfaces of any two or three side surfaces connected to each other, for example, on the first side surface 1041 and the second side surface 1042, on the second side surface 1042 and the third side surface 1043, on the third side surface 1043 and the fourth side surface 1044, on the first side surface 1041, the second side surface 1042 and the third side surface 1043, on the second side surface 1042, the third side surface 1043 and the fourth side surface 1044, and on the third side surface 1043, the fourth side surface 1044 and the first side surface 1041.

Figure 5:
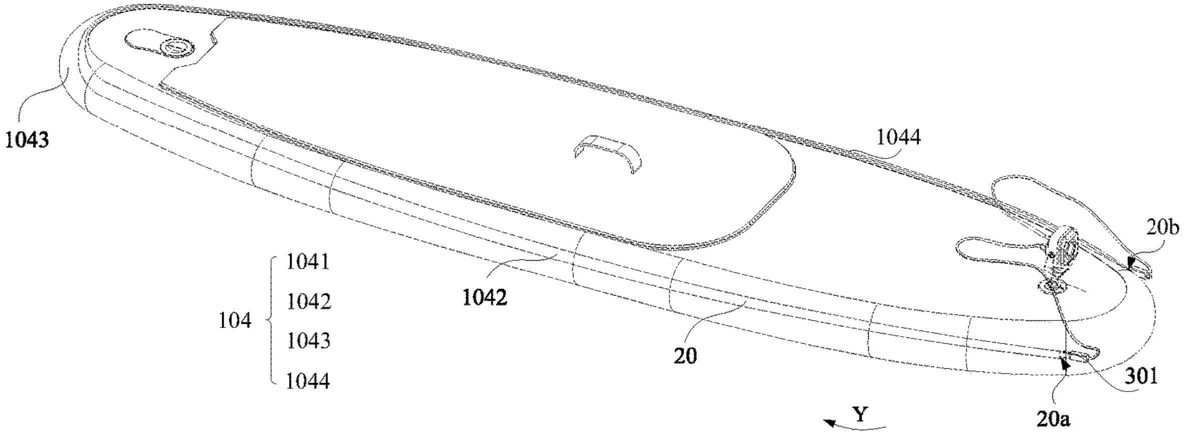
FIG. 5 shows a second schematic perspective view of an arrangement of the external bin of the inflatable product with a light-emitting positioning structure according to the embodiments of the utility model; wherein the external bin extends continuously along the second side surface, the third side surface and the fourth side surface.

Exemplarily, please refer to FIG. 5, the external bin 20 extends continuously along the second side surface 1042, the third side surface 1043, and the fourth side surface 1044, one end of the external bin 20 extends continuously from the second side surface 1042 to the fourth side surface 1044 after passing through the third side surface 1043, the external bin 20 includes a first opening 20*a* and a second opening 20*b* which are used for inserting into and extending out of the LED light bar 301, the first opening 20*a* is located in the second side surface 1042 as a starting end, and the second opening 20*b* is located in the fourth side surface 1044 as an ending end; and when the inflation chamber 101 is in an uninflated state, the LED light bar 301 can be inserted into the external bin 20 through the first opening 20*a*, and then extends out of the external bin 20 through the second opening 20*b*.

Exemplarily, the external bin 20 may also extend continuously along the first side surface 1041 and the second side surface 1042, one end of the external bin 20 extending continuously from the first side surface 1041 to the second side surface 1042, and the external bin 20 includes a first opening 20*a* located in the first side surface 1041, and a second opening 20*b* located in the second side surface 1042; and when the inflation chamber 101 is in an uninflated state, the LED light bar 301 can be inserted into the external bin 20 through the first opening 20*a*, and then extends out of the external bin 20 through the second opening 20*b*.

In one embodiment, the external bins 20 may also extend intermittently on any one or more of the first side surface 1041, the second side surface 1042, the third side surface 1043, and the fourth side surface 1044.

It can be seen from the above that the first side surface 1041, the second side surface 1042, the third side surface 1043, and the fourth side surface 1044 of the side wall 104 are connected in sequence in the circumferential direction (the Y direction as shown in FIG. 4), thus, the external bins 20 may extend intermittently on any one or more of the four side surfaces, e.g. the external bin is connected on one or two or three or four side surfaces, but the external bin is not continuous, i.e., the external bins each includes two openings.

In the case of such intermittent extension, one LED light bar 301 is selected, one end of the LED light bar 301 is inserted from one opening in a certain side surface, and extends out from the other opening of the certain side surface after a distance, and is then sequentially inserted into the opening in the other side surface, and then extends out from the other opening in the other side surface circumferentially in this way, and several sections of the LED light bar 301 disposed on the two or three or four side surfaces are exposed after the arrangement is completed.

In one possible embodiment, the external bins 20 may also extend intermittently on the outer side surfaces of any two or three side surfaces.

Figure 6:
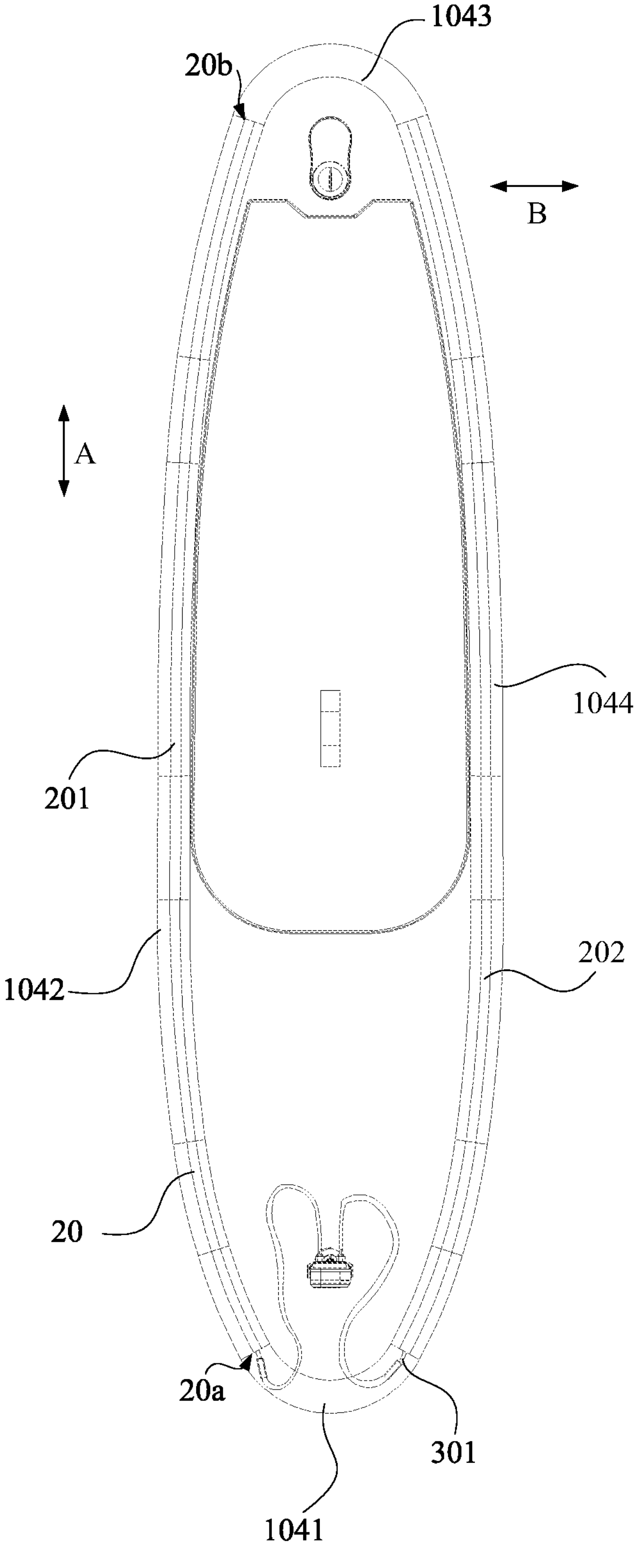
FIG. 6 shows a third schematic top view of an arrangement of the external bins of the inflatable product with a light-emitting positioning structure according to the embodiments of the utility model; wherein the external bins extend intermittently along the second side surface and the fourth side surface.

Exemplarily, referring to FIG. 6, the external bins 20 extend intermittently along the second side surface 1042 and the fourth side surface 1044; that is, one external bin 20 is disposed on the second side surface 1042 while the other external bin 20 is disposed on the fourth side surface 1044; and the external bin 20 on the second side surface 1042 and the external bin 20 on the fourth side surface 1044 are each provided with a first opening 20*a* and a second opening 20*b*.

In an uninflated state of the inflation chamber 101, one end of the LED light bar 301 is inserted into the first opening 20*a* in the second side surface 1042, then extends out from the second opening 20*b* in the second side surface 1042, passes through the third side surface 1043 where the external bin 20 is not provided, continues to be inserted into the first opening 20*a* in the fourth side surface 1044, and finally extends out from the second opening 20*b* in the fourth side surface 1044. In this case, the LED light bar 301 is exposed on the third side surface.

The second side surface 1042 and the fourth side surface 1044 are oppositely disposed along the length direction of the main body (an A direction shown in FIG. 6), and both external bins 20 are each in a long straight segment.

The LED light bar 301 on the second side surface 1042 is inserted into the external bin 20 on the second side surface 1042 through the first opening 20*a* in the second side surface 1042, and extends out of the external bin 20 on the second side surface 1042 through the second opening 20*b* in the second side surface 1042 after passing through a first straight segment 201 when the inflation chamber 101 is in an uninflated state.

The LED light bar 301 on the fourth side surface 1044 is inserted into the external bin 20 on the fourth side surface 1044 through the first opening 20*a* in the fourth side surface 1044, and extends out of the external bin 20 on the fourth side surface 1044 through the second opening 20*b* in the fourth side surface 1044 after passing through a long second straight segment 202 when the inflation chamber 101 is in an uninflated state.

In one possible embodiment, the length of the first straight segment 201 and the length of the second straight segment

202 may be the same, or the first straight segment 201 may be longer than the second straight segment 202, or the first straight segment 201 may be shorter than the second straight segment 202, which may be selected according to the actual application. In one possible embodiment, one or two or more external bins 20 may be disposed on the second side surface 1042 and/or the fourth side surface 1044, depending on the actual application and the height between the upper and lower ends of the second side surface 1042 and/or the fourth side surface 1044 in the thickness direction of the main body (the X direction as shown in FIG. 1).

Exemplarily, the external bins 20 extend intermittently along the first side surface 1041 and the third side surface 1043, respectively (this arrangement is not shown in the figure, but with continued reference to FIG. 6 for each structure), that is, one external bin 20 is disposed on the first side surface 1041 while the other external bin 20 is disposed on the third side surface 1043, the first side surface 1041 and the third side surface 1043 are oppositely disposed in the width direction of the main body (a B direction as shown in FIG. 6), both external bins 20 are each in a short curved segment, and each include a first opening 20*a* and a second opening 20*b*.

The LED light bar 301 on the first side surface 1041 is inserted into the external bin 20 on the first side surface 1041 through the first opening 20*a* in the first side surface 1041, and extends out of the external bin 20 on the first side surface 1041 through the second opening 20*b* in the first side surface 1041 after passing through a short first curved segment when the inflation chamber 101 is in an uninflated state.

The LED light bar 301 on the third side surface 1043 is inserted into the external bin 20 on the third side surface 1043 through the first opening 20*a* in the third side surface 1043, and extends out of the external bin 20 on the third side surface 1043 through the second opening 20*b* in the third side surface 1043 after passing through a short second curved segment when the inflation chamber 101 is in an uninflated state.

In one possible embodiment, the length of the first curved segment and the length of the second curved segment may be the same, or the first curved segment may be longer than the second curved segment, or the first curved segment may be shorter than the second curved segment, which may be selected according to the actual application. In one possible embodiment, one or two or more external bins 20 may be disposed on the first side surface 1041 and/or the third side surface 1043, depending on the actual application and the height between the upper and lower ends of the first side surface 1041 and/or the third side surface 1043 in the thickness direction of the main body (the X direction as shown in FIG. 1).

Figure 7:
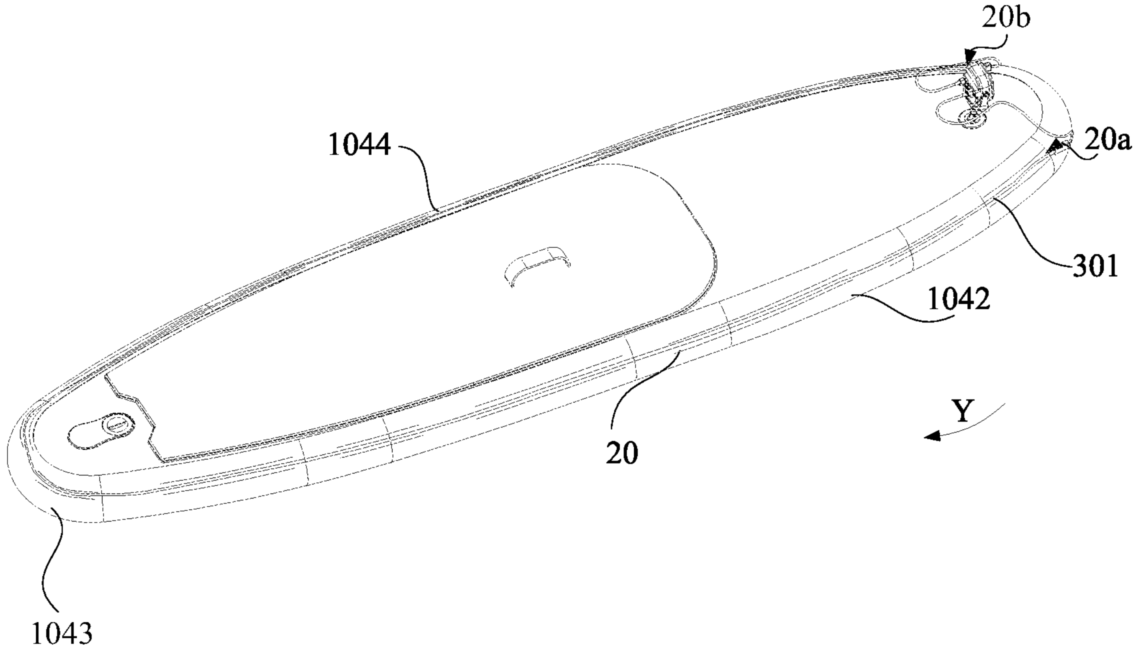
FIG. 7 shows a fourth schematic perspective view of an arrangement of the external bins of the inflatable product with a light-emitting positioning structure according to the embodiments of the utility model; wherein the external bins extend intermittently along the second side surface, the third side surface, and the fourth side surface.

As shown in FIG. 7, exemplarily, the external bins 20 are disposed on the second side surface 1042, the third side surface 1043 and the fourth side surface 1044, and the external bins on the second side surface 1042, the third side surface 1043 and the fourth side surface 1044 are each provided with a first opening 20*a* and a second opening 20*b*. In an uninflated state of the inflation chamber, one end of one LED light bar 301 is inserted from the first opening 20*a* in the second side surface 1042, and extends out from the second opening 20*b* in the second side surface 1042 after being inserted for a distance, is then inserted into the first opening 20*a* in the third side surface 1043, and extends out from the second opening 20*b* in the third side surface 1043, continues to be inserted into the first opening 20*a* in the fourth side surface 1044, and finally extends out from the second opening 20*b* in the fourth side surface 1044, and at this time, the LED light bar 301 between the second opening 20*b* in the second side surface 1042 and the first opening 20*a* in the third side surface 1043, between the second opening 20*b* in the third side surface 1043 and the first opening 20*a* in the fourth side surface 1044, and between the second opening 20*b* in the fourth side surface 1044 and the first opening 20*a* in the second side surface 1042 is exposed.

Exemplarily, the external bins 20 intermittently extending may also be disposed on the second side surface 1042 and the fourth side surface 1044 (this arrangement is not shown in the figure, but with continued reference to FIG. 7 for each structure), and the external bin 20 on the second side surface 1042 and the external bin 20 on the fourth side surface 1044 are each provided with a first opening 20*a* and a second opening 20*b*. In an uninflated state of the inflation chamber 101, one end of the LED light bar 301 is inserted into the first opening 20*a* in the second side surface 1042, then extends out from the second opening 20*b* in the second side surface 1042, passes through the third side surface 1043 where the external bin 20 is not provided, continues to be inserted into the first opening 20*a* in the fourth side surface 1044, and finally extends out from the second opening 20*b* in the fourth side surface 1044. In this case, the LED light bar 301 is exposed on the third side surface 1043.

In the embodiments of the arrangements of the external bin 20, the external bin 20 may be disposed on the second side surface 1042, the third side surface 1043, and the fourth side surface 1044, or may be disposed on the first side surface 1041, the second side surface 1042, and the third side surface 1043, or may be disposed on the first side surface 1041 and the third side surface 1043, or may only be disposed on the fourth side surface 1044, or the like, with various arrangements. The embodiments of the present application do not limit the side surfaces where the external bins 20 intermittently extending are disposed, as long as the intermittent extension of the external bins 20 can be realized, and the requirement that the external bins 20 can receive the LED light bar 301 in an uninflated state, and then the LED light bar 301 is relatively fixed by inflation is satisfied, they fall within the protection scope of the embodiments of the present application, which can be selected according to the actual application.

The embodiments of the present application do not limit the number of the external bins 20 intermittently extending, and a plurality of sets of the external bins 20 intermittently extending may be provided. When the plurality of sets of the external bins 20 are provided, the plurality of sets of the external bins 20 may be parallel to each other, may be staggered to each other, may be perpendicular to each other, or may be inclined at a certain angle with respect to the outer side surface of the side wall. They fall within the protection scope of the embodiments of the present application as long as the external bins 20 intermittently extending can be disposed on the side wall, and the requirement that the external bins 20 receive the LED light bar 301 in an uninflated state, and the LED light bar 301 is relatively fixed by inflation is satisfied.

Some embodiments in which the external bin 20 is disposed on the upper surface 102 and/or the lower surface 103 will be described below.

Figure 8:
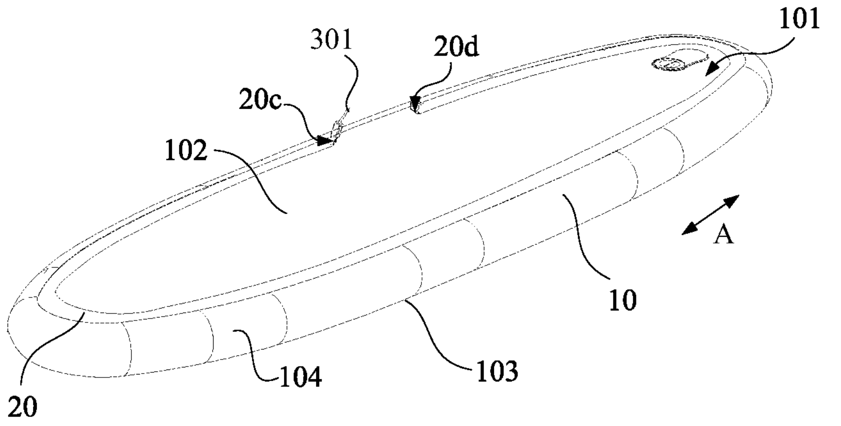
FIG. 8 shows a fifth schematic perspective view of an arrangement of the external bins of the inflatable product with a light-emitting positioning structure according to the embodiments of the utility model; wherein the external bins extend intermittently along a face profile of an upper surface.
Figure 9:
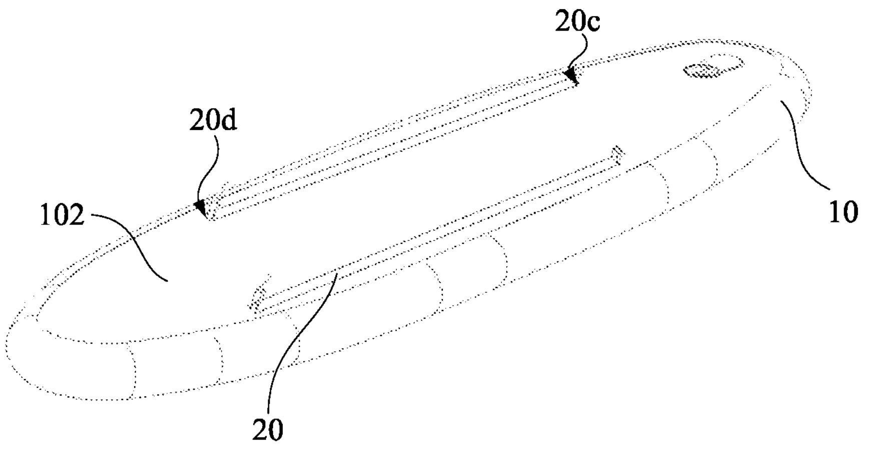
FIG. 9 shows a sixth schematic perspective view of an arrangement of the external bins of the inflatable product with a light-emitting positioning structure according to the embodiments of the utility model; wherein the external bins extend intermittently in a straight line on a surface of the upper surface.
Figure 10:
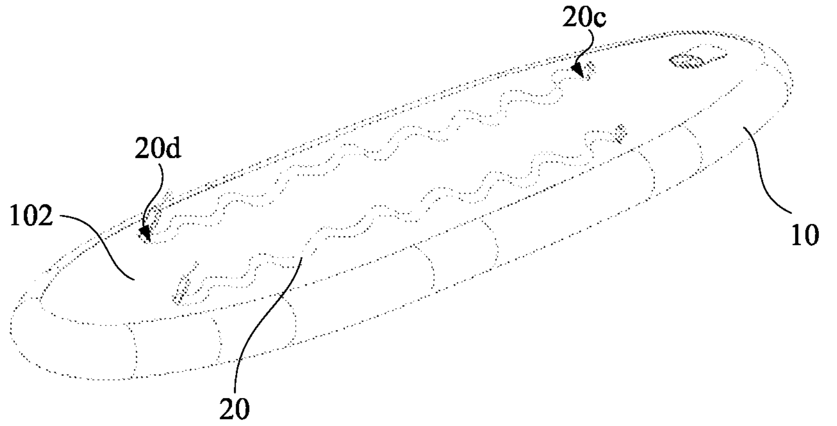
FIG. 10 shows a seventh schematic perspective view of an arrangement of the external bins of the inflatable product with a light-emitting positioning structure according to the embodiments of the utility model; wherein the external bins extend intermittently in a curved line on the surface of the upper surface.

In addition to the embodiments described above in which the external bin 20 is disposed on the side wall 104, the external bin 20 in the embodiments of the present application may also be disposed on the upper surface 102 and/or the lower surface 103 of the main body 10. As shown in FIGS. 8, 9 and 10, the external bin 20 may extend along a face edge or in any location on a surface; second, the extension may be continuous or intermittent.

Referring to FIG. 8, the external bin 20 includes a third opening 20*c* and a fourth opening 20*d*, the third opening 20*c* and the fourth opening 20*d* are located at the same side or at different sides of the main body 10, and the LED light bar 301 can be inserted into the external bin 20 through the third opening 20*c*, and extends out of the external bin 20 through the fourth opening 20*d* when the inflation chamber 101 is in an uninflated state.

Exemplarily, the external bin 20 extends continuously along a face profile of the upper surface 102, the external bin 20 includes a third opening 20*c* and a fourth opening 20*d*, along the length direction of the main body 10 (an A direction shown in FIG. 8), the third opening 20*c* and the fourth opening 20*d* are located at the same side, and at this time, while keeping the inflation chamber 101 uninflated, one end of the LED light bar 301 is inserted into the third opening 20*c*, and then extends out from the fourth opening 20*d* after passing through for approximately one circle along the external bin 20 on the face profile of the upper surface 102. Exemplarily, as shown in FIG. 8, the external bin 20 and the LED light bar 301 in the external bin 20 are each in the shape of an unclosed ellipse at this time, and the unclosed position is a distance between the third opening 20*c* and the fourth opening 20*d*.

In one possible embodiment, the third opening 20*c* and the fourth opening 20*d* can also be located at both sides along the length direction of the main body 10, exemplarily, the third opening 20*c* and the fourth opening 20*d* are disposed at opposite sides, and at this time, the external bin 20 has a semi-elliptical shape.

Exemplarily, continuous extension in the embodiments of the present application means that the inflatable product is provided with one complete external bin including two openings, the first opening to the second opening of the external bin being continuous.

The embodiments of the present application do not limit the extension direction of the continuous extension, for example, the external bin 20 may continuously extend in a straight line, in a broken line, in a curved form, in an arc shape or the like, and they fall within the protection scope of the embodiments of the present application as long as the extensions can satisfy the requirement that the external bin 20 continuously extends on the upper surface 102, the lower surface 103, and the side wall 104, such that the luminous body 30 is inserted into the external bin 20 in an uninflated state, and then the luminous body 30 is relatively fixed to the external bin 20 by inflation.

Exemplarily, the external bins 20 may also extend intermittently along a face profile of the lower surface 103 as shown in FIG. 8. In one possible embodiment, the external bins extend relatively intermittently along the face profile of the lower surface along the length direction of the main body 10 (the A direction shown in FIG. 8), and the external bins on both sides of the length direction of the main body each include a third opening and a fourth opening.

(This arrangement is not shown in the figure).

In one possible embodiment, one end of the LED light bar is inserted from the third opening of the external bin at one side, and then extends out from the fourth opening of the external bin at the one side, and is subsequently inserted into the third opening of the external bin at the other side, and finally extends out from the fourth opening of the external bin at the other side, and at this time, the LED light bar between the third opening of the external bin at one side and the fourth opening of the external bin at the other side, and between the fourth opening of the external bin at the one side and the fourth opening of the external bin at the other side is exposed.

Exemplarily, intermittent extension in the embodiments of the present application means that the inflatable product is provided with a plurality of external bins which are discontinuous as a whole.

For example, disposing the external bins intermittently extending on one side surface (e.g., the first side surface 1041 shown in FIG. 4) means that the first side surface 1041 is provided with a plurality of external bins each including two openings.

For example, one external bin intermittently extending is disposed on both side surfaces (e.g., the first side surface 1041 and the third side surface 1043 shown in FIG. 4), e.g., one external bin is disposed on each of the first side surface 1041 and the third side surface 1043, and the two external bins are discontinuous, and the two external bins on the first side surface 1041 and the third side surface 1043 each include two openings.

The inflatable product with a light-emitting positioning structure in the embodiments of the present application does not limit the extension direction of the intermittent extension, for example, the extension may be intermittent extension in a straight line, or intermittent extension that is in a straight line as a whole, or is intermittent extension in a broken line, in a curved form, in an arc shape or the like, and they fall within the protection scope of the embodiments of the present application as long as the extensions can satisfy the requirement that the external bins intermittently extend on the upper surface, the lower surface, and the side wall, such that the luminous body is inserted into the external bins in an uninflated state, and then the luminous body is relatively fixed to the external bins by inflation.

Figure 11:
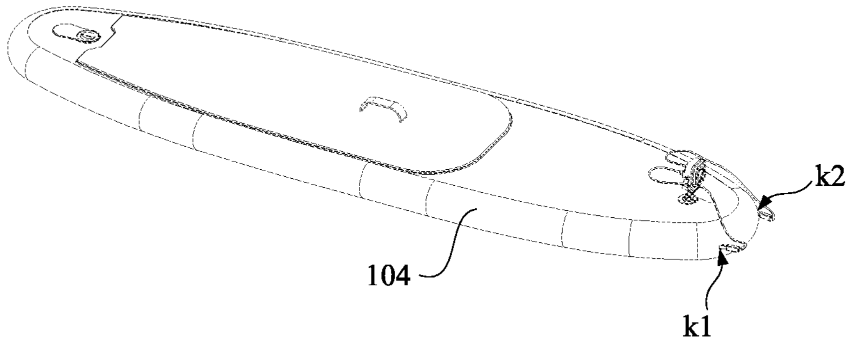
FIG. 11 shows a schematic perspective view of an arrangement of the inflation chamber and the external bin of the inflatable product with a light-emitting positioning structure according to the embodiments of the utility model; wherein the inflation chamber is spaced apart from the main body, and the external bin is disposed on the side chamber wall; and a first connecting port and a second connecting port are disposed at a side wall.
Figure 12:
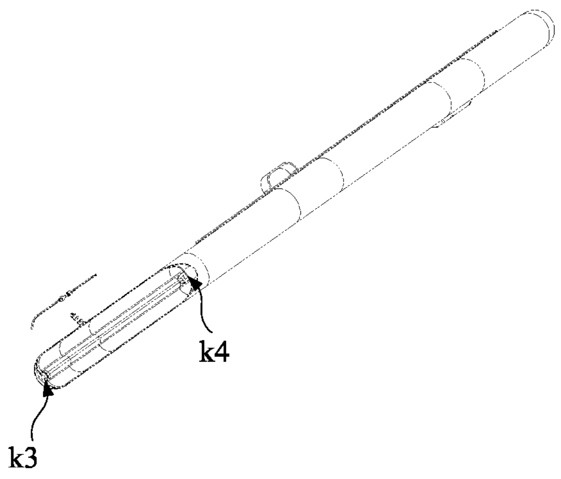
FIG. 12 shows a first cross-sectional view of an arrangement of the inflation chamber and the external bin of the inflatable product with a light-emitting positioning structure according to the embodiments of the utility model; wherein the inflation chamber is spaced apart from the main body, and the external bin is disposed on the inner side wall of the side chamber wall; and a third connecting port and a fourth connecting port are disposed at the side chamber wall.
Figure 13:
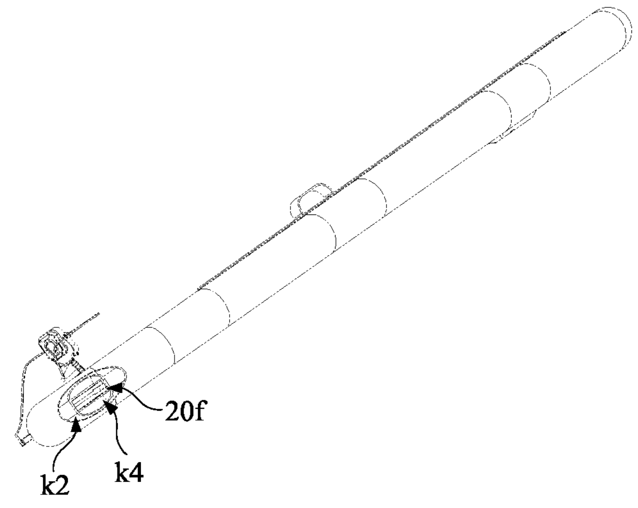
FIG. 13 shows a second cross-sectional view of an arrangement of the inflation chamber and the external bin of the inflatable product with a light-emitting positioning structure according to the embodiments of the utility model; wherein the inflation chamber is spaced apart from the main body, and the external bin is disposed on the inner side wall of the side chamber wall.

Referring to FIG. 3 in conjunction with FIGS. 11, 12, and 13, according to the above description, there is another arrangement for the inflation chamber 101 in the embodiments of the present application, the main body 10 includes an upper surface 102, a lower surface 103, and a side wall 104, and the inflation chamber 101 is a separate chamber disposed within the upper surface 102, the lower surface 103, and the side wall 104.

The inflation chamber 101 includes an upper chamber wall 1011, a lower chamber wall 1012, and a side chamber wall 1013, the upper chamber wall 1011 and the lower chamber wall 1012 are located on opposite sides of the side chamber wall 1013 along the thickness direction of the main body 10 (the X direction as shown in FIG. 1), and the upper chamber wall 1011, the lower chamber wall 1012 and the side chamber wall 1013 enclose a complete inflation chamber 101.

The upper chamber wall 1011 is attached to the upper surface 102, the lower chamber wall 1012 is attached to the lower surface 103, and the side wall 104 is spaced apart from the side chamber wall 1013 along a width direction and a length direction of the main body 10, and the side wall 104 surrounds an exterior of the side chamber wall 1013 to form a connecting channel S.

In this embodiment, the external bin 20 may also be disposed on an inner side wall and/or an outer side wall of the side chamber wall 1013.

Exemplarily, the external bin 20 extends continuously or intermittently along the side chamber wall 1013, the external bin 20 includes a fifth opening 20*e* and a sixth opening 20*f*, and the side wall 104 is provided with a first connecting port k1 and a second connecting port k2 which are configured to communicate with the fifth opening 20*e* and the sixth opening 20*f*, respectively.

Exemplarily, the external bin 20 extends continuously along the inner side wall of the side chamber wall 1013, as shown in FIG. 3, the external bin 20 is located inside the inflation chamber 101, and is in an ellipse on the inner side wall of the side chamber wall 1013 (FIG. 3 shows a semi-sectional view of the inflatable product 1, thus showing only half an ellipse); and at this time, the side chamber wall 1013 is further provided with a third connecting port k3 and a fourth connecting port k4 which are configured to communicate with the first connecting port k1 and the second connecting port k2, respectively.

In an uninflated state, one end of the LED light bar passes through the first connecting port k1, the third connecting port k3 and the fifth opening 20*e* in sequence, and then extends out from the sixth opening 20*f*, the fourth connecting port k4 and the second connecting port k2 in sequence (as shown in FIG. 13) after surrounding the inner side wall of the side chamber wall 1013 for approaching one circle, and then the inflation chamber 101 is inflated, and the LED light bar is fixed relative to the external bin 20.

In one possible embodiment, the third connecting port k3 and the fourth connecting port k4 where the LED light bar has passed through are sealed (e.g., using a blanching sealing process), thereby ensuring the sealability of the inflation chamber 101.

Exemplarily, the external bin 20 may also extend continuously along the outer side wall of the side chamber wall 1013 (this arrangement is not shown in the figure, but with continued reference to FIG. 3 in conjunction with FIGS. 11, 12 and 13 for each structure), i.e., the external bin 20 extends in an ellipse in the above connecting channel S (shown in FIG. 3); and at this time, the first connecting port k1 and the second connecting port k2 are disposed at the side wall 104, and no connecting port is formed in the inflation chamber 101.

In an uninflated state, one end of the LED light bar passes through the first connecting port k1 and the fifth opening 20*e* in sequence, and then extends out from the sixth opening 20*f* and the second connecting port k2 in sequence after surrounding the outer side wall of the side chamber wall 1013 for approaching one circle, and then the inflation chamber 101 is inflated, and the LED light bar is fixed relative to the external bin 20.

Figure 14:
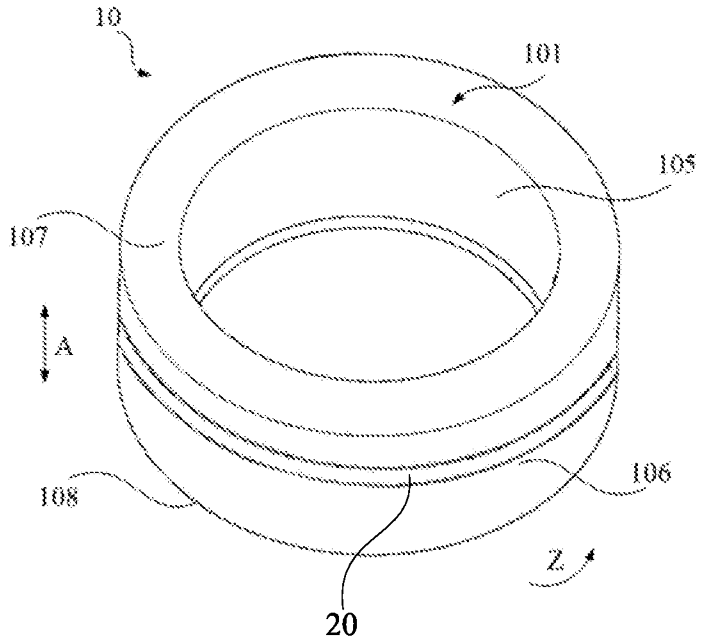
FIG. 14 shows a second schematic perspective view of the inflatable product with a light-emitting positioning structure according to the embodiments of the utility model.

Please refer to FIG. 14, the main body 10 in the embodiments of the present application may also be in an inflatable water pool structure.

The main body 10 includes an inner wall 105, an outer wall 106, an upper edge 107 and a bottom surface 108, the inner wall 105 encloses a receiving space in a circumferential direction (a Z direction as shown in FIG. 14), the outer wall 106 is spacedly disposed outside the inner wall 105, and disposed around the inner wall 105, in the height direction of the main body 10 (an A direction as shown in FIG. 14), the upper edge 107 is connected to upper ends of the inner wall 105 and the outer wall 106, the bottom surface 108 is connected to lower ends of the inner wall 105 and the outer wall 106, and the upper edge 107, a portion of the bottom surface 108, the inner wall 105 and the outer wall 106 form the inflation chamber 101; and the other portion of the bottom surface 108 is connected to the lower end of the inner wall 105 in the height direction of the main body 10 to form a receiving groove (for holding water) with the inner wall 105.

There are a plurality of arrangements for the external bin 20, and the external bin 20 may be disposed on outer sides of any one or more of the inner wall 105, the outer wall 106, the upper edge 107 and the bottom surface 108, e.g., the external bin 20 may be disposed only on the inner wall 105 or the outer wall 106 or the upper edge 107 or the bottom surface 108, or the external bins 20 may be disposed on the inner wall 105 and the outer wall 106, disposed on the upper edge 107 and the bottom surface 108, disposed on the outer wall 106, the upper edge 107 and the bottom surface 108, etc.

In addition, there are a plurality of arrangements on the inner wall 105, the outer wall 106, the upper edge 107, and the bottom surface 108, including but not limited to: disposing on the outer side of the inner wall 105 (one side close to the inflation chamber 101); disposing on a top surface of the upper edge 107 in the height direction of the main body 10; and disposing on the outer side of the bottom surface 108 (one side in contact with the ground).

The arrangement and the number of the external bins 20 of the inflatable water pool structure, the extension and the number of the corresponding LED light bar, etc. are the same as those of the above embodiment taking the inflatable paddle board as an example, which is not limited in the embodiments of the present application, and as long as the external bin 20 can receive the LED light bar in an uninflated state, and then the LED light bar is relatively fixed by inflation, it falls within the protection scope of the embodiments of the present application, which can be selected according to the actual application.

Although the utility model has been illustrated and described with reference to some preferred embodiments of the utility model, those of ordinary skill in the art should understand that the above content is a further detailed description of the utility model in conjunction with the specific embodiments, and it cannot be considered that the specific embodiments of the utility model are limited only to these descriptions. Those skilled in the art may make various changes in forms and details, including several simple deductions or substitutions, without departing from the spirit and scope of the utility model.

The invention claimed is:

1. An inflatable product with a light-emitting positioning structure, comprising:

a main body provided with an internal inflation chamber; and an external bin fixedly attached to the main body, and configured to receive a removable luminous body through at least one opening of the external bin, wherein, the removable luminous body is movable relative to the external bin when the removable luminous body is inserted into the external bin and the inflation chamber is in a deflated state; and wherein, the removable luminous body is in a fixed position relative to the external bin when the removable luminous body is inserted into the external bin and the inflation chamber is in an inflated state, and wherein the external bin or the main body can transmit light.

2. The inflatable product with a light-emitting positioning structure according to claim 1, wherein the external bin is further configured to allow the removable luminous body to be inserted, and wherein the removable luminous body is inserted into the external bin when the inflation chamber is in an uninflated state.

3. The inflatable product with a light-emitting positioning structure according to claim 2, wherein the main body comprises an upper surface, a lower surface and a side wall, the upper surface and the lower surface are located on opposite sides of the side wall in a thickness direction of the main body, and the upper surface, the lower surface and the side wall enclose the inflation chamber; and wherein the external bin is fixedly attached to any one or more of the upper surface, the lower surface, and the side wall.

4. The inflatable product with a light-emitting positioning structure according to claim 1, wherein the main body comprises an upper surface, a lower surface and a side wall, the inflation chamber comprises an upper chamber wall, a lower chamber wall and a side chamber wall, the upper chamber wall is attached to the upper surface, the lower chamber wall is attached to the lower surface, and the side wall surrounds an exterior of the side chamber wall, and is spaced apart from the side chamber wall, and wherein the external bin is fixedly attached to any one or more of the upper surface, the lower surface, and the side wall are provided with the external bin or the side chamber wall.

5. The inflatable product with a light-emitting positioning structure according to claim 4, wherein the external bin is fixedly attached to an inner side wall or an outer side wall of the side chamber wall, and wherein the external bin is located between the side chamber wall and the side wall when the external bin is fixedly attached to the outer side wall of the side chamber wall.

6. The inflatable product with a light-emitting positioning structure according to claim 5, wherein the external bin extends continuously or intermittently along the inner side wall or the outer side wall of the side chamber wall, the external bin comprises a fifth opening and a sixth opening, and the side wall is provided with a first connecting port and a second connecting port which are configured to communicate with the fifth opening and the sixth opening, respectively.

7. The inflatable product with a light-emitting positioning structure according to claim 6, wherein when the external bin extends continuously or intermittently along the inner side wall of the side chamber wall, the side chamber wall further comprises a third connecting port and a fourth connecting port which are configured to communicate with the first connecting port and the second connecting port, respectively, the third connecting port and the fourth connecting port enabling sealing.

8. The inflatable product with a light-emitting positioning structure according to claim 4, wherein the external bin is fixedly attached to an outer side of the side wall, and the external bin extends along the side wall.

9. The inflatable product with a light-emitting positioning structure according to claim 8, wherein the side wall comprises a first side surface, a second side surface, a third side surface and a fourth side surface which are connected in sequence in a circumferential direction; and wherein the external bin extends continuously or intermittently on any one or more of the first side surface, the second side surface, the third side surface and the fourth side surface.

10. The inflatable product with a light-emitting positioning structure according to claim 9, wherein the external bin extends continuously along the first side surface, the second side surface, the third side surface, and the fourth side surface, the external bin comprises a first opening and a second opening, and the first opening is located at one end of the first side surface, and the second opening is disposed at the other end of the first side surface relative to the first opening in the circumferential direction, and wherein when the inflation chamber is in an uninflated state, the removable luminous body can be inserted into the external bin through the first opening, and then extends out of the external bin through the second opening.

11. The inflatable product with a light-emitting positioning structure according to claim 9, wherein the external bin extends continuously along the second side surface, the third side surface and the fourth side surface, the external bin comprises a first opening located in the second side surface, and a second opening located in the fourth side surface, and wherein when the inflation chamber is in an uninflated state, the removable luminous body can be inserted into the external bin through the first opening, and then extends out of the external bin through the second opening.

12. The inflatable product with a light-emitting positioning structure according to claim 9, wherein the external bin extends continuously along the first side surface and the second side surface, the external bin comprises a first opening located in the first side surface, and a second opening located in the second side surface, and wherein when the inflation chamber is in an uninflated state, the removable luminous body can be inserted into the external bin through the first opening, and then extends out of the external bin through the second opening.

13. The inflatable product with a light-emitting positioning structure according to claim 9, wherein the external bin extends intermittently along the second side surface and the fourth side surface, respectively, the external bin located at each of the second side surface and the fourth side surface comprises a first opening and a second opening, and wherein when the inflation chamber is in an uninflated state, the removable luminous body can be inserted into the external bin through the first openings, and then extends out of the external bin through the second openings.

14. The inflatable product with a light-emitting positioning structure according to claim 9, wherein the external bin extends intermittently along the first side surface and the third side surface, respectively, the external bin located at each of the first side surface and the third side surface comprises a first opening and a second opening; and when the inflation chamber is in an uninflated state, the removable luminous body can be inserted into the external bin through the first openings, and then extends out of the external bin through the second openings.

15. The inflatable product with a light-emitting positioning structure according to claim 9, wherein the external bin extends intermittently along the second side surface, the third side surface and the fourth side surface, the external bin located at each of the second side surface, the third side surface and the fourth side surface comprises a first opening and a second opening, and wherein when the inflation chamber is in an uninflated state, the removable luminous body can be inserted into the external bin through the first openings, and then extends out of the external bin through the second openings.

16. The inflatable product with a light-emitting positioning structure according to claim 4, wherein the external bin is fixedly attached to the upper surface or the lower surface, and the external bin extends continuously or intermittently along a face edge or a surface of the upper surface or the lower surface.

17. The inflatable product with a light-emitting positioning structure according to claim 16, wherein the external bin comprises a third opening and a fourth opening which are located at the same side or at different sides of the main body, and when the inflation chamber is in an uninflated state, the removable luminous body can be inserted into the external bin through the third opening, and then extends out of the external bin through the fourth opening.

18. The inflatable product with a light-emitting positioning structure according to claim 1, wherein the main body comprises an inner wall, an outer wall, an upper edge and a bottom surface, the inner wall encloses a receiving space in a circumferential direction, and the outer wall is disposed around the inner wall, wherein in a height direction of the main body, the upper edge is connected to upper ends of the inner wall and the outer wall, the bottom surface is connected to lower ends of the inner wall and the outer wall, and the upper edge, a portion of the bottom surface, the inner wall, and the outer wall form the inflation chamber, and wherein the external bin is fixedly attached to any one or more of the inner wall, the outer wall, the upper edge, and the bottom surface.

19. The inflatable product with a light-emitting positioning structure according to claim 1, wherein the main body is provided with a power supply device, and wherein the removable luminous body is a light bar, and both ends of the light bar are provided with connection terminals connected to the power supply device.

20. The inflatable product with a light-emitting positioning structure according to claim 19, wherein the power supply device is a searchlight.

21. An inflatable product with a light-emitting positioning structure, comprising:

a main body provided with an internal inflation chamber; and at least one external bin, each of the at least one external bin fixedly attached along a length of an outer surface of the main body and configured to receive a removable luminous body, wherein, the removable luminous body is movable relative to the external bin when the removable luminous body is inserted into the external bin and the inflation chamber is in a deflated state; and wherein, the removable luminous body is in a fixed position relative to the at least one external bin when the removable luminous body is inserted into the at least one external bin along the length of the outer surface of the main body and the inflation chamber is in an inflated state, and wherein an outermost surface of the at least one external bin can transmit light.

22. An inflatable product with a light-emitting positioning structure, comprising:

a main body comprising an upper surface, a lower surface and a side wall connecting the upper surface with the lower surface, the main body provided with an internal inflation chamber, the internal inflation chamber comprising an upper chamber wall, a lower chamber wall, and a side chamber wall connecting a perimeter of the upper chamber wall to a perimeter of the lower chamber wall; and an external bin extending continuously or intermittently along an inner surface of the side chamber wall of the internal inflation chamber and configured to receive a removable luminous body, wherein, the removable luminous body is movable relative to the external bin when the removable luminous body is inserted into the external bin and the inflation chamber is in a deflated state; and wherein, the removable luminous body is in a fixed position relative to the external bin when the removable luminous body is inserted into the external bin along the inner surface of the side chamber wall and the inflation chamber is inflated, and wherein side wall of the main body and the side chamber wall of the external bin can transmit light.

23. The inflatable product of claim 22, wherein the side wall of the main body is provided with a first connecting port and a second connecting port, and wherein the side chamber wall of the internal inflation chamber further comprises a third connecting port and a fourth connecting port which are configured to communicate with the first connecting port and the second connecting port, respectively, the third connecting port and the fourth connecting port enabling sealing.

* * * * *